US005983921A

United States Patent [19]

Miyazoe et al.

[11] Patent Number: 5,983,921

[45] Date of Patent: Nov. 16, 1999

[54] DIRECTIONAL-CONTROL-VALVE-CONNECTED BODY

[75] Inventors: Shinji Miyazoe; Ryushiro Kaneko; Hideharu Sato, all of Tsukuba-gun, Japan

[73] Assignee: SMC Corporation, Tokyo, Japan

[21] Appl. No.: 09/176,314

[22] Filed: Oct. 22, 1998

[30] Foreign Application Priority Data

Nov. 10, 1997 [JP] Japan .................................... 9-323752

[51] Int. Cl.[6] ............................. F16K 31/42; F16K 27/00

[52] U.S. Cl. ....................... 137/269; 137/596.16; 137/884

[58] Field of Search ..................................... 137/884, 269, 137/271, 596.16, 625.64

[56] References Cited

U.S. PATENT DOCUMENTS

| | | | |
|---|---|---|---|
| 5,459,953 | 10/1995 | Fukano et al. | 137/596.16 X |
| 5,586,570 | 12/1996 | Fukano et al. | 137/596.16 X |
| 5,749,395 | 5/1998 | Hayashi et al. | 137/596.16 |
| 5,771,918 | 6/1998 | Fukano et al. | 137/271 X |
| 5,860,445 | 1/1999 | Yoshimura et al. | 137/884 X |
| 5,868,157 | 2/1999 | Yoshimura et al. | 137/625.64 X |

FOREIGN PATENT DOCUMENTS

| | | |
|---|---|---|
| 64-17078 | 1/1989 | Japan . |
| 1-163270 | 11/1989 | Japan . |
| 1-174684 | 12/1989 | Japan . |

*Primary Examiner*—Stephen Hepperle
*Assistant Examiner*—John Bastianelli
*Attorney, Agent, or Firm*—Oblon, Spivak, McClelland, Maier & Neustadt, P.C.

[57] ABSTRACT

A relay surface formed on a supply-and-ejection block has opened therein a pilot supply channel and a pilot ejection channel both in communication with each directional control valve through a manifold block, a supply branch passage branching from a supply port, and an ejection branch passage branching from an ejection port. The pilot supply and ejection channels are connected to a port for supplying a pilot fluid and a port for ejecting a pilot fluid, respectively, via a relay member mounted on the relay surface.

3 Claims, 5 Drawing Sheets

DIRECTIONAL-CONTROL-VALVE-CONNECTED BODY

FIELD OF THE INVENTION

The present invention relates to a directional-control-valve-connected body in which a plurality of pilot-operated directional control valves are mounted on manifold blocks, and in particular, to a directional-control-valve-connected body that can simultaneously change the pilot fluid supply method for each directional control valve between an internal and an external pilot type.

PRIOR ART

Japanese Utility Model Laid Open No. 64-17078 discloses a known pilot-operated directional control valve using a pilot fluid to switch a main valve wherein a switching mechanism can change the pilot fluid supply method between an internal and an external pilot type.

According to this well-known directional control valve, however, the switching mechanism is built into an individual directional control valve, so if a plurality of directional control valves are connected together and the pilot fluid supply method must be changed, the switching mechanism must be operated for each individual directional control valve. Thus, the change operation is very cumbersome and may cause malfunctioning. In addition, it is very difficult in terms of design and manufacturing to integrate the switching mechanism into a directional control valve that does not have available space due to the large number of parts and channels provided. Such a configuration is also expensive.

DISCLOSURE OF THE INVENTION

It is a main technical object of this invention to provide a directional-control-valve-connected body in which a plurality of pilot-operated directional control valves are mounted on manifold blocks, wherein a simple mechanism is provided in supply-and-ejection blocks connected to the directional control valves so that this mechanism can be used to change the pilot fluid supply method for all the directional control valves simultaneously, without the need to provide, in the individual directional control valves, switching mechanisms for changing the pilot fluid supply method.

To achieve this object, this invention provides a directional-control-valve-connected body wherein a plurality of manifold blocks, on which pilot-operated directional control valves are mounted, are connected together with supply-and-ejection blocks, each having a supply port and an ejection port.

Each supply-and-ejection block includes a pilot supply channel and a pilot ejection channel, both in communication with each of the manifold blocks; a relay surface into which the pilot supply and ejection channels are opened; and a pilot supply branch passage and a pilot ejection branch passage that branch from the supply and ejection ports, respectively, and that are opened into the relay surface. A relay member is detachably mounted on this relay surface so that the pilot supply and ejection channels are connected via the relay member to a port for supplying a pilot fluid and a port for ejecting a pilot fluid, respectively.

According to this configuration, the relay surface is formed on the supply-and-ejection block, and the pilot supply and ejection channels are opened into the relay surface and connected to the ports for supplying and ejecting a pilot fluid, via the relay member mounted on the relay surface. Thus, by simply changing the relay member to one of a different form, the pilot fluid supply method can be simultaneously changed for all valves between the internal and external pilot types.

That is, a relay member including a channel that connects the pilot supply channel to the supply port can be used to set the directional-control-valve-connected body to the internal pilot type, whereas a relay member including a channel that connects the pilot supply channel to the external pilot port can be used to set the directional-control-valve-connected body to the external pilot type.

According to a specific embodiment of this invention, the relay member includes a supply communication passage that allows the pilot supply channel and the pilot supply branch passage opened into the relay surface to communicate mutually, and an ejection communication passage that allows the pilot ejection channel and the pilot ejection branch passage to communicate mutually. This design allows the directional-control-valve-connected body to be configured as the internal pilot type that guides part of a control fluid from the supply port to each directional control valve as a pilot fluid while ejecting a pilot fluid from each directional control valve to the exterior through the ejection port.

According to another specific embodiment, the relay member includes an external pilot port that introduces a pilot fluid from the exterior; a pilot ejection port that ejects a pilot fluid from each directional control valve; a communication passage that allows the pilot supply and ejection channels, which are both opened into the relay surface, to communicate with the external and pilot port and the pilot ejection port, respectively; and a means for closing the pilot supply and ejection branch passages both opened into the relay surface. This design allows the directional-control-valve-connected body to be configured as the external pilot type that guides a pilot fluid from the external pilot port to each directional control valve.

DETAILED DESCRIPTION

Figure 1:
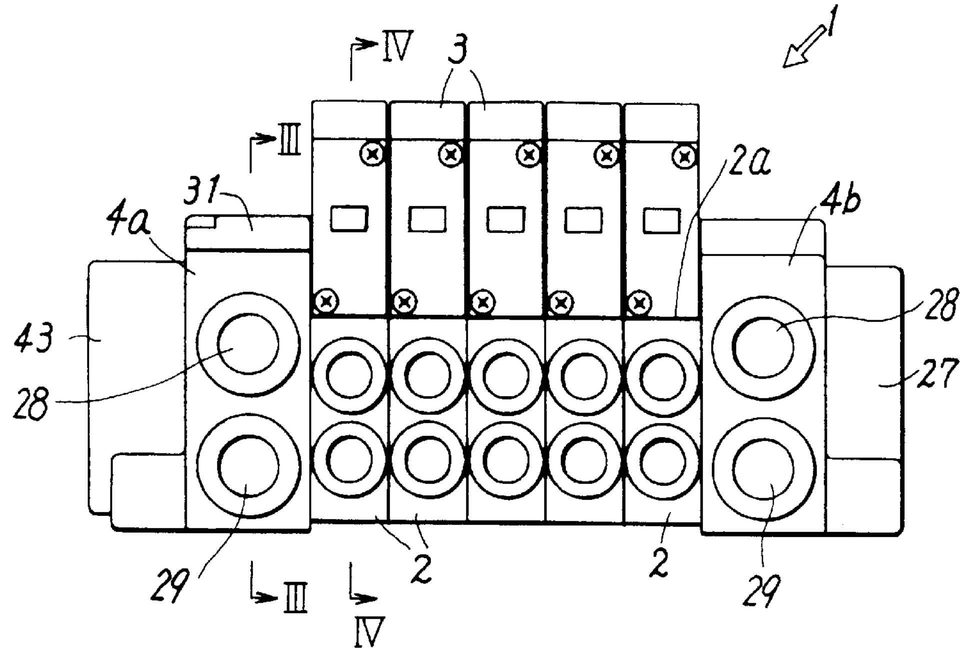
FIG. 1 is a front view in which a directional-control-valve-connected body according to this invention is set as an internal pilot type.
Figure 2:
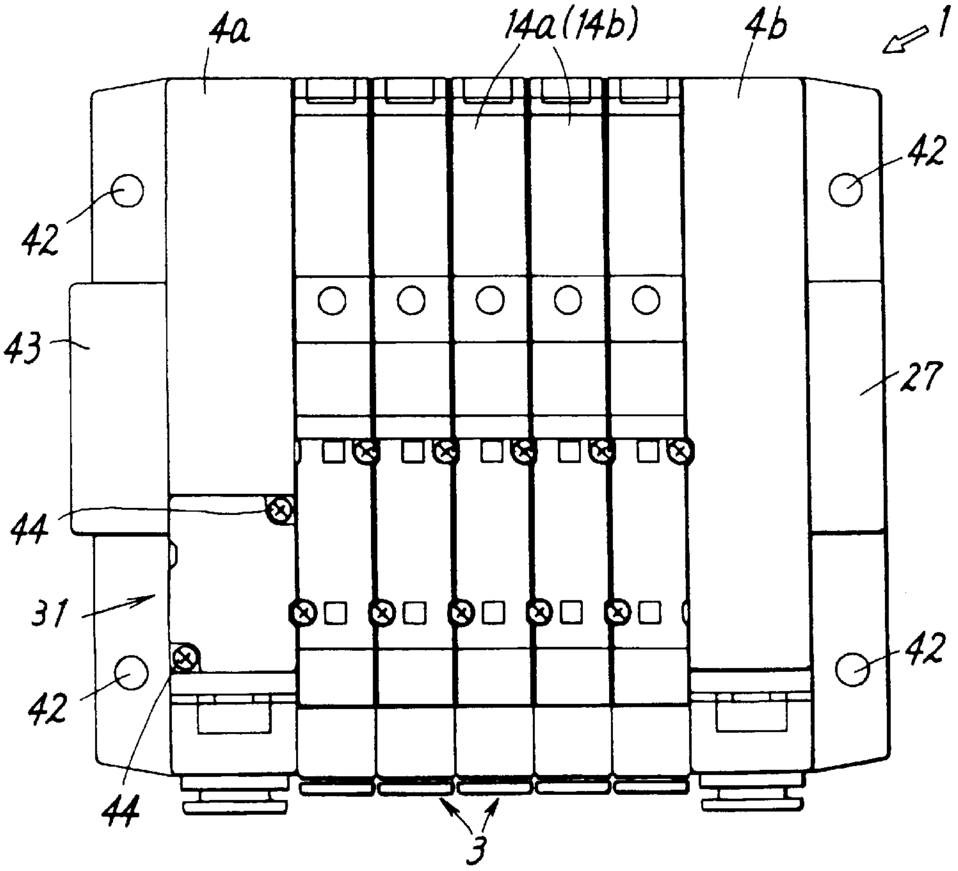
FIG. 2 is a top view of FIG. 1.

FIGS. 1 and 2 show one embodiment of a directional-control-valve-connected body according to this invention. A directional-control-valve-connected body 1 comprises a plurality of separate manifold blocks 2 connected in the direction of the horizontal width; a pilot-operated directional control valve 3 mounted on a valve-installation surface 2*a* on top of each of the manifold blocks 2; and first and second supply and ejection blocks 4*a* and 4*b* connected to the respective sides of the connected manifold blocks 2.

Figure 4:
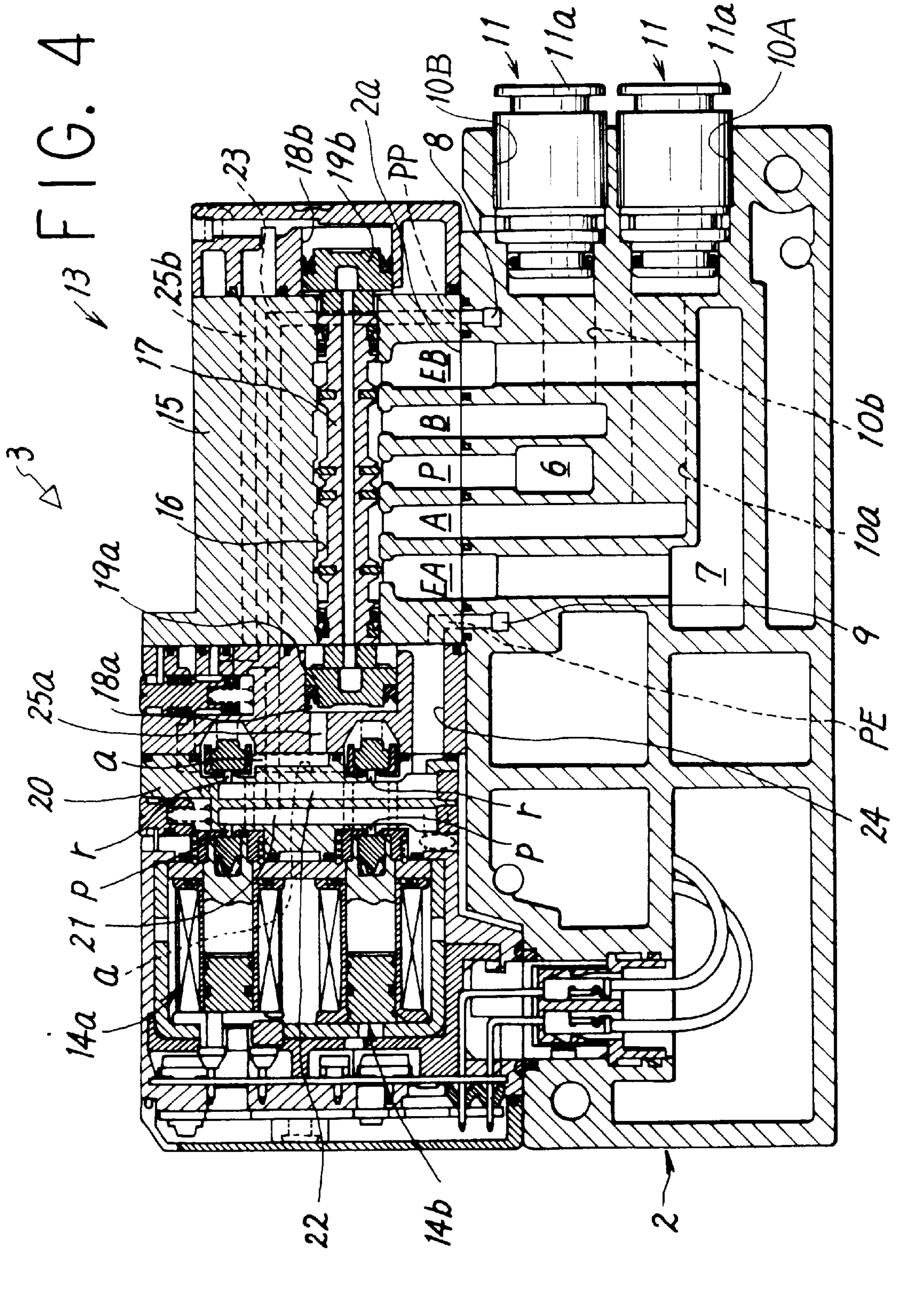
FIG. 4 is a sectional view taken along line IV—IV in FIG. 1.

As shown in FIG. 4 in detail, the manifold block 2 includes a supply channel 6 and an ejection channel 7 for a control fluid that penetrate the block in the connecting direction, and a pilot supply channel 8 and a pilot a ejection channel 9. The channels 6, 7, 8, and 9 are opened into a valve-installation surface 2*a* and are in communication with a supply opening P, ejection openings EA and EB, a pilot supply opening PP, and a pilot ejection opening PE all in the directional control valve 3 installed on the valve-installation surface 2*a*.

The manifold block 2 also has two output ports 10A and 10B in its front surface, and these output ports 10A and 10B are opened into the valve-installation surface 2*a* via communication passages 10*a* and 10*b*, and are in communication with output openings A and B in the directional control valve 3, respectively.

Quick pipe joints 11 are attached to the output ports 10A and 10B. When a tube is inserted into the pipe joint 11, a claw member elastically engages and locks the tube. When a release bush 11*a* is pressed in, the claw member is released from the tube to allow the tube to be pulled out.

The directional control valve 3 comprises a main valve 13 that switches channels for a control fluid such as compressed air; and first and second solenoid-operated pilot valves 14*a* and 14*b* that use a pilot fluid to switch the main valve 13.

A valve body 15 of the main valve 13 includes a valve hole 16 into which the supply opening P, output openings A and B, and ejection openings EA and EB are opened. A valve disc 17 is slidably inserted into the valve hole 16 in an airtight manner to switch the channel between the output openings A and B and the supply opening P and ejection ports EA and EB.

The main valve 13 also includes first and second piston chambers 18*a* and 18*b* on the respective sides of the valve hole 16 in its axial direction, with first and second pistons 19*a* and 19*b* of the same diameter slidably inserted into the piston chambers in an airtight manner.

The pilot valves 14*a* and 14*b* each have the same configuration as a well-known three-port solenoid-operated valve and includes a pilot input opening (p), a pilot output opening (a), and a pilot ejection opening (r). By magnetizing and demagnetizing the solenoid, the channel is switched between the pilot output opening (a) and the pilot input or ejection opening (p) or (r). The pilot input openings (p) in the pilot valves 14*a* and 14*b* are in communication with a common pilot input channel 21 formed in a pilot valve body 20, and the pilot ejection openings (r) are in communication with a common pilot ejection channel 22. The pilot input channel 21 is in communication with the pilot supply opening PP through a supply communication passage 23, and the pilot ejection channel 22 is in communication with the pilot ejection opening PE through an ejection communication passage 24.

In addition, the output opening (a) in the pilot valve 14*a* is in communication with the first piston chamber 18*a* through a first communication passage 25*a*, and the output opening (a) in the pilot valve 14*b* is in communication with the second piston chamber 18*b* through a second communication passage 25*b*.

In the directional control valve 3, when the solenoid in the first pilot valve 14*a* is magnetized, a pilot fluid supplied to the first piston chamber 18*a* causes the first piston 19*a* and the valve disc 17 to move rightward in the figure while pressing the second piston 19*b*, thereby allowing the output opening A and the supply opening P to communicate mutually while allowing the output opening B and the ejection port EB to communicate mutually. Consequently, a control fluid is output through the first output port 10A in the manifold block 2.

In addition, when the solenoid in the first pilot valve 14*a* is demagnetized and the solenoid in the second pilot valve 14*b* is magnetized, a pilot fluid supplied to the second piston chamber 18*b* causes the second piston 19*b* and the valve disc 17 to move leftward in the figure while pressing the first piston 19*a*, thereby allowing the output opening B and the supply opening P to communicate mutually while allowing the output opening A and the ejection port EA to communicate mutually. Consequently, a pressure fluid is output through the second output port 10B in the manifold block 2.

Although the illustrated directional control valve 3 is of a five-port type, this invention is not limited to this aspect but may be of a three- or four-port valve.

In addition, the directional control valve according to this invention is not limited to a double solenoid type having the two pilot valves 14*a* and 14*b*, but may be of a single solenoid type that uses a single pilot valve to drive the valve disc in the main valve.

The supply-and-ejection blocks 4*a* and 4*b* each have a supply port 28 for introducing a control fluid and an ejection port 29 for ejecting a control fluid. One of the supply-and-ejection blocks simultaneously supplies a control fluid and a pilot fluid to each directional control valve 3 through each manifold block 2, and simultaneously ejects a control fluid and a pilot fluid ejected from each directional control valve 3. Reference numeral 30 designates a pipe joint.

Figure 3:
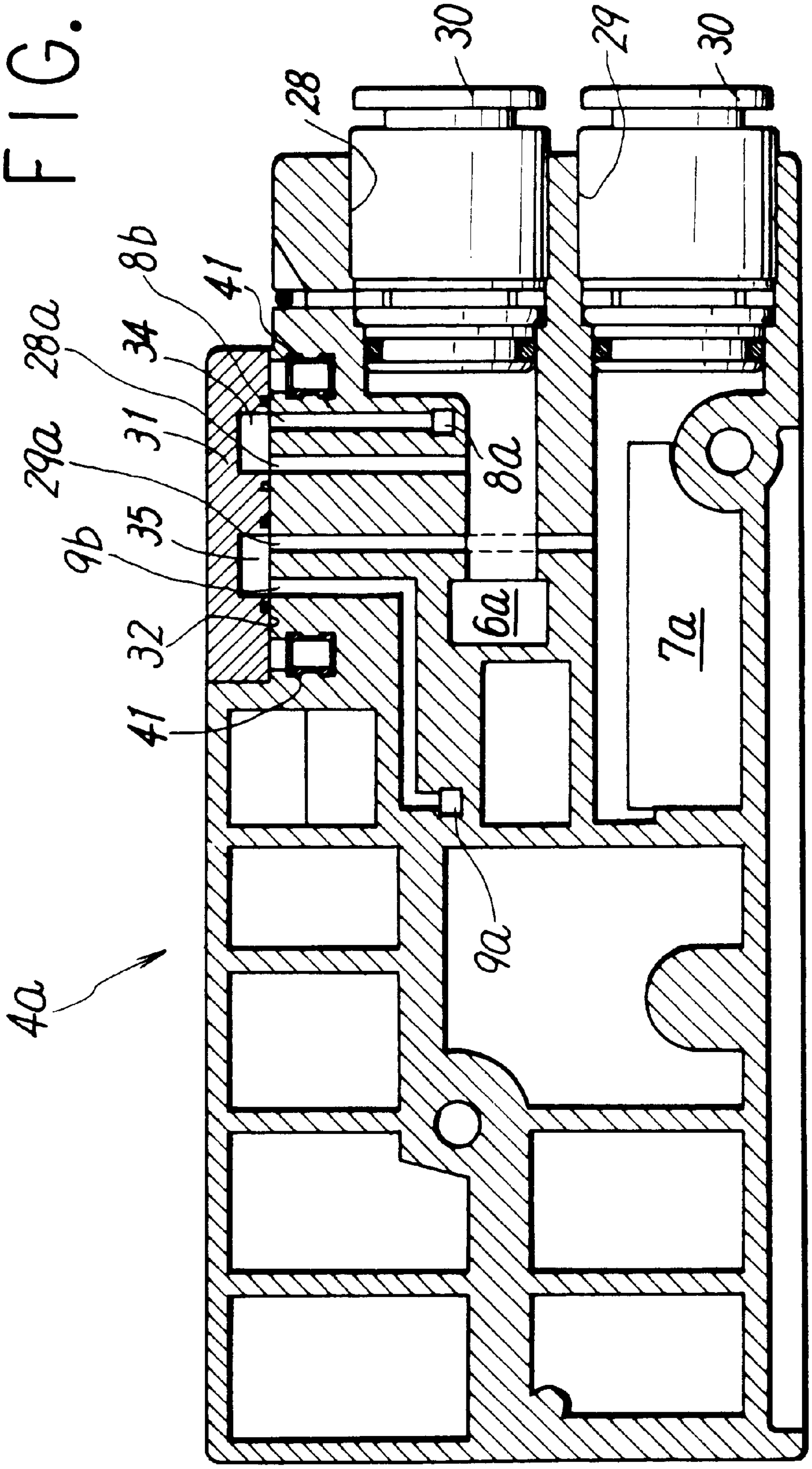
FIG. 3 is a sectional view taken along line III—III in FIG. 1.

FIG. 3 shows the first supply-and-ejection block 4*a*. The supply-and-ejection block 4*a* has a supply channel 6*a* and an ejection channel 7*a* leading to the supply channel 6 and the ejection channel 7 in the manifold block 2, respectively, and also has a pilot supply channel 8*a* and a pilot ejection channel 9*a* leading to the pilot supply and ejection channels 8 and 9, respectively. The supply channel 6*a* is in communication with the supply port 28, and the ejection channel 7*a* is in communication with the ejection port 29.

A relay surface 32 on which a relay member 31 is mounted is formed on top of the supply-and-ejection block 4*a*. The pilot supply and ejection channels 8*a* and 9*a* are opened into the relay surface 32 via the communication passages 8*b* and 9*b*, respectively. A pilot supply branch passage 28*a* branching from the supply port 28 and a pilot ejection branch passage 29*a* branching from the ejection port 29 are opened adjacent to the pilot supply and ejection channels 8*a* and 9*a*, respectively.

The relay member 31 connects the pilot supply and ejection channels 8*a* and 9*a* opened into the relay surface 32 to a port for supplying a pilot fluid and a port for ejecting a pilot fluid, respectively.

The relay member 31A shown in FIG. 3 is configured so as to connect the supply and ejection channels 8*a* and 9*a* to the supply and ejection ports 28 and 29. That is, the relay member 31A includes a supply communication passage 34 allowing the pilot supply channel 8*a* and the pilot supply branch channel 28*a* to communicate mutually; and an ejection communication passage 35 allowing the pilot ejection channel 9*a* and the pilot ejection branch channel 29*a* to communicate mutually. The communication passages 34 and 35 guide part of a control fluid from the supply port 28 to each directional control valve 3 as a pilot fluid, while ejecting a pilot fluid from each directional control valve 3 to the exterior through the ejection port 29. Accordingly, if the relay member 31A is mounted on the relay surface 32, the pilot fluid supply method for the directional-control-valve-connected body 1 is set as the internal pilot type.

A terminal box 43 also acting as a cover is mounted on the outer surface of the supply-and-ejection block 4*a* to close the end of each channel 6*a*, 7*a*, 8*a*, or 9*a*. The terminal box 43 simultaneously supplies power to the solenoids in the directional control valves 3.

The second supply-and-ejection block 4*b* substantially has the same configuration as the first supply-and-ejection block 4*a* except that it is not configured so as to simultaneously supply a pilot fluid to all directional control valves. That is, the supply-and-ejection block 4*b* ?does not have a configuration associated with the relay surface 32 and the relay member 31, so the communication passages 8*b* and 9*b* or the supply and ejection branch channels 28*a* and 29*a* are not formed in this block. In addition, the end of each channel 6*a*, 7*a*, 8*a*, or 9*a* is closed by a plate-like cover 27.

The second supply-and-ejection block 4*b*, however, may have the same configuration as the first supply-and-ejection block 4*a*, or may be omitted and only the first supply-and-ejection block 4*a* may be provided.

Figure 5:
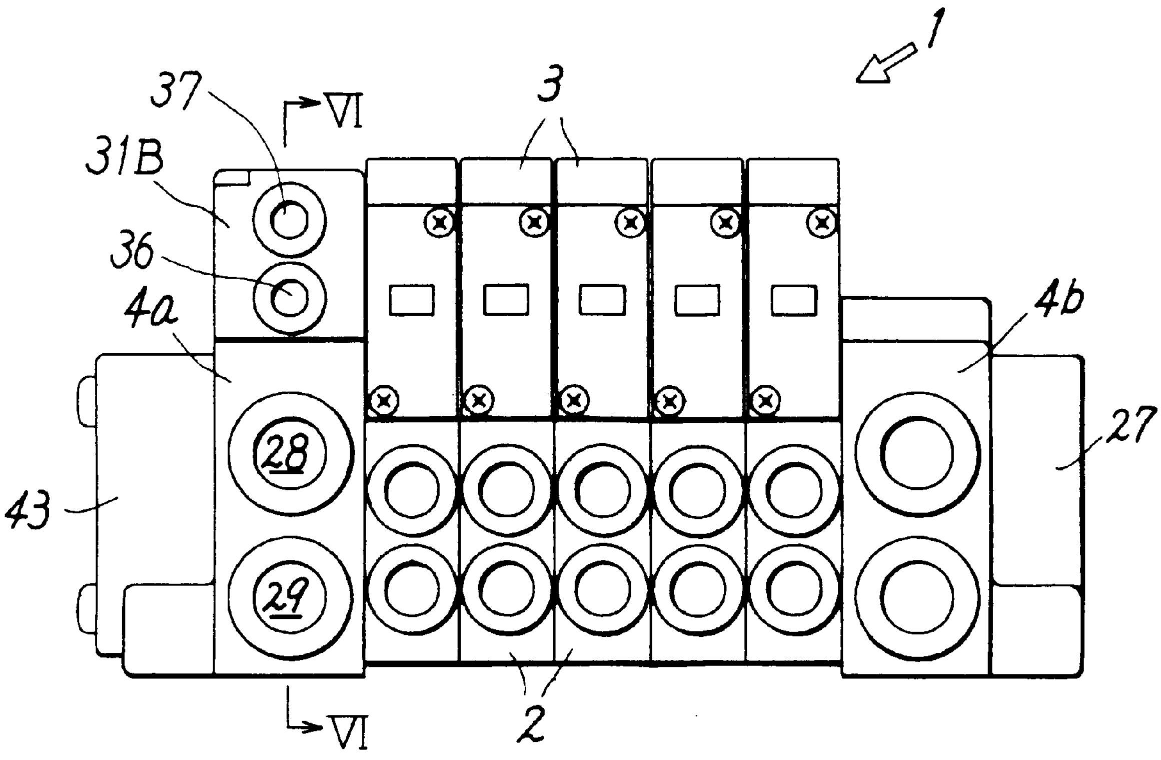
FIG. 5 is a front view in which the directional-control-valve-connected body according to this invention is set as an external pilot type.
Figure 6:
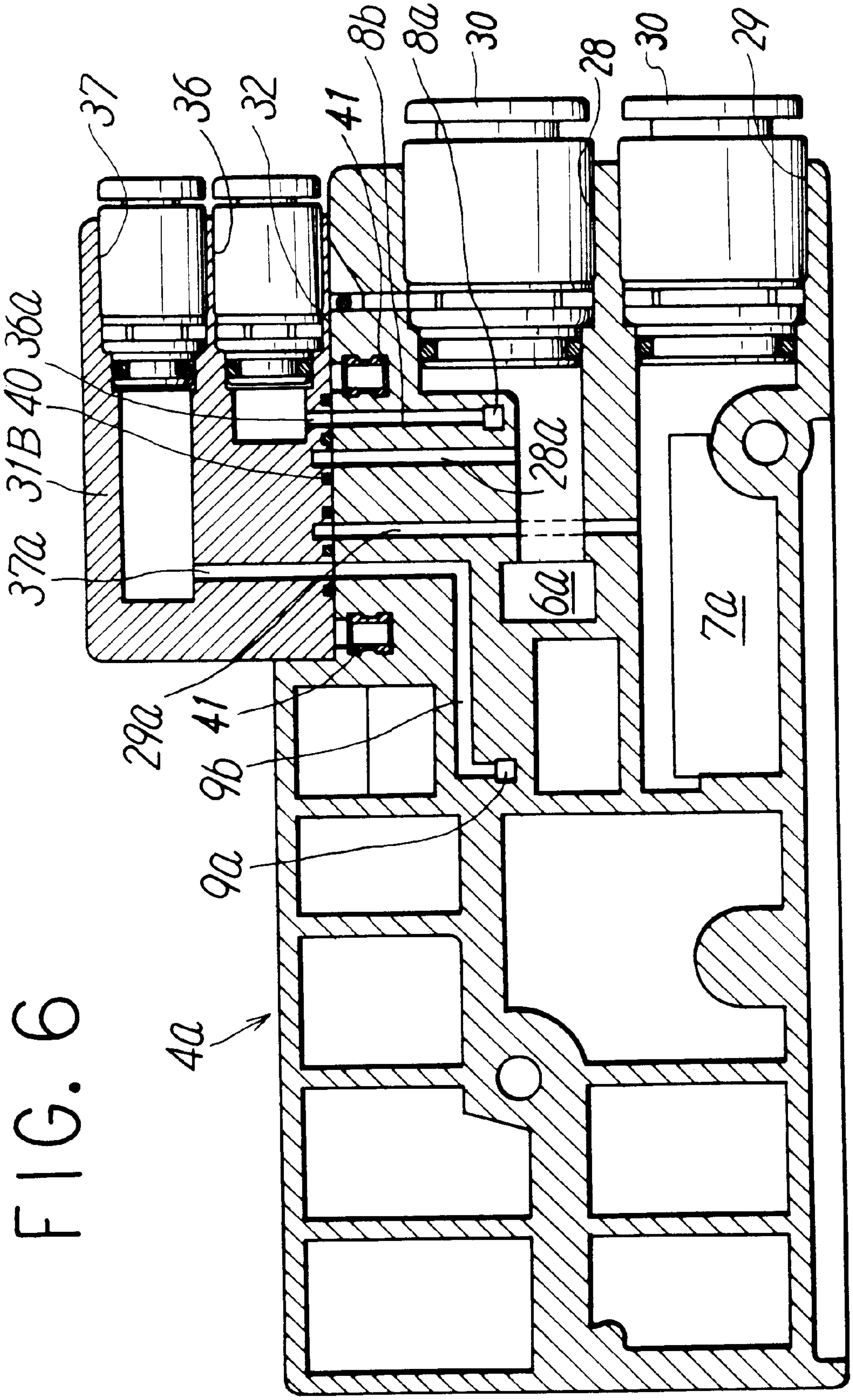
FIG. 6 is a sectional view taken along line VI—VI in FIG. 5.

The relay member 31 can be replaced by one of another configuration to directly change the directional-control-valve-connected body to the external pilot type. FIGS. 5 and 6 show the directional-control-valve-connected body that is set as the external pilot type using a relay member 31B of a different configuration.

The relay member 31B has in its front surface an external pilot port 36 for introducing a pilot fluid from the exterior and a pilot ejection port 37 for ejecting a pilot fluid from each directional control valve 3 to the exterior. The ports 36 and 37 are opened into the surface jointed with the relay surface 32 via the communication passages 36*a* and 37*a*. When the relay member 31B is mounted on the relay surface 32, the external pilot port 36 is connected to the pilot supply channel 8*a* through the communication passages 36*a* and 8*b*, while the pilot ejection port 37 is connected to the pilot ejection channel 9*a* through the communication passages 37*a* and 9*b*. In addition, the junction surface of the relay member 31B has a seal member 40 that closes the pilot supply and ejection branch passages 28*a* and 29*a*, which have been opened into the relay surface 32.

Thus, by mounting the relay member 31B on the relay surface 32, the pilot supply and ejection channels 8*a* and 9*a* are shut off from the supply and ejection ports 28 and 29, respectively, and are connected to the external pilot port 36 and the pilot ejection port 37, respectively. Accordingly, the directional-control-valve-connected body 1 is set as the external pilot type.

Reference numeral 41 in the figure designates a nut used to mount each relay member 31 using screws 44, and 42 is a hole used to fix a solenoid-operated-valve assembly.

Thus, the relay surface 32 is formed on the supply-and-ejection block 4*a*, and the pilot supply and ejection channels 8*a* and 9*a* are opened into the relay surface 32 and connected via the relay member 31 mounted to the relay surface 32 to the port 28 or 36 for supplying a pilot fluid and the port 29 or 37 for ejecting a pilot fluid, respectively. Thus, by changing the relay member 31 to one of a different form, the supply-and-ejection block 4*a* can be used to simultaneously change the pilot fluid supply method for all valves between the internal and external pilot types.

What is claimed is:

1. A directional-control-valve-connected body comprising at least one supply-and-ejection block including a supply port for introducing a control fluid and an ejection port for ejecting a control fluid;

a plurality of separate manifold blocks that are connected to the supply-and-ejection blocks, on each of which a pilot-operated directional control valve is mounted, and which relays a control fluid between said supply-and-ejection block and the pilot-operated directional control valves; and said plurality of pilot-operated directional control valves that are switched by a pilot fluid supplied from said supply-and-ejection block through each manifold block, wherein:

Each supply-and-ejection block includes a pilot supply channel and a pilot ejection channel both in communication with each of said manifold blocks, a relay surface into which the pilot supply and ejection channels are opened, a pilot supply branch passage and a pilot ejection branch passage that branch from said supply and ejection ports, respectively, and that are opened into the relay surface, and a relay member detachably mounted on said relay surface so that said pilot supply and ejection channels are connected via the relay member to a port for supplying a pilot fluid and a port for ejecting a pilot fluid, respectively.

2. A directional-control-valve-connected body according to claim 1 wherein said relay member includes a supply communication passage that allows the pilot supply channel and the pilot supply branch passage opened into said relay surface to communicate mutually and a ejection communication passage that allows the pilot ejection channel and the pilot ejection branch passage to communicate mutually, thereby allowing the directional-control-valve-connected body to be configured as the internal pilot type that guides part of a control fluid from the supply port to each directional control valve as a pilot fluid while ejecting a pilot fluid from each directional control valve to the exterior through the ejection port.

3. A directional-control-valve-connected body according to claim 1 wherein said relay member includes an external pilot port that introduces a pilot fluid from the exterior; a pilot ejection port that ejects a pilot fluid from each directional control valve to the exterior; a communication passage that allows the pilot supply and ejection channels which have been opened into said relay surface to communicate with the external pilot port and the pilot ejection port, respectively; and a means for closing said pilot supply and ejection branch passages which have been opened into the relay surface, respectively, thereby allowing the directional-control-valve-connected body to be configured as the external pilot type that guides a pilot fluid from said external pilot port to each directional control valve.

* * * * *